Feb. 18, 1936.  A. OBERHOFFKEN  2,030,890
CONTROL MECHANISM FOR MACHINE TOOLS AND THE LIKE
Filed April 1, 1933   4 Sheets-Sheet 1

Inventor
Alexander Oberhoffken
By Churchill, Parker & Carlson
Attorneys

Feb. 18, 1936.  A. OBERHOFFKEN  2,030,890
CONTROL MECHANISM FOR MACHINE TOOLS AND THE LIKE
Filed April 1, 1933    4 Sheets-Sheet 2
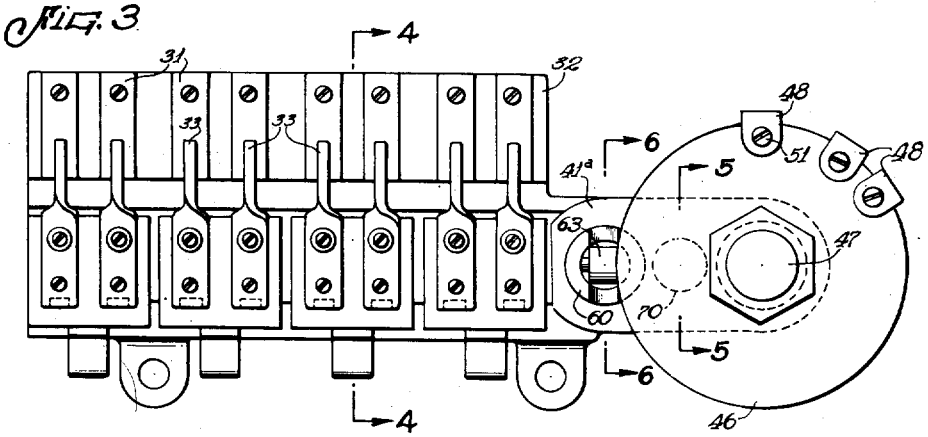
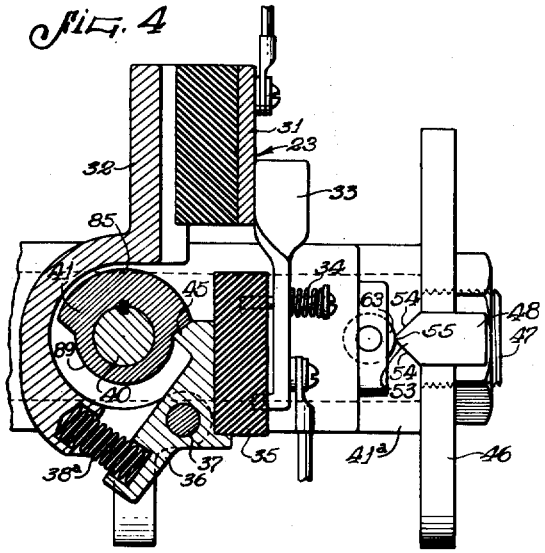
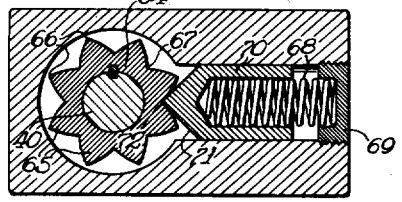
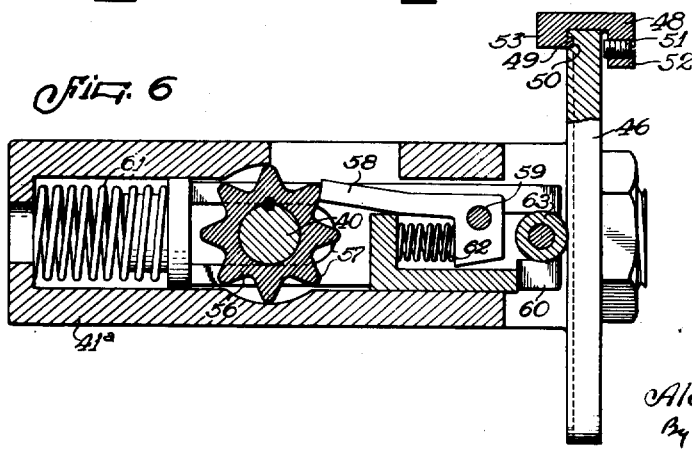
Inventor
Alexander Oberhoffken
By Chindahl, Parker & Carlson
Attorneys Feb. 18, 1936.   A. OBERHOFFKEN   2,030,890
CONTROL MECHANISM FOR MACHINE TOOLS AND THE LIKE
Filed April 1, 1933    4 Sheets-Sheet 3

Inventor
Alexander Oberhoffken
By Chindahl, Parker & Carlson
Attorneys

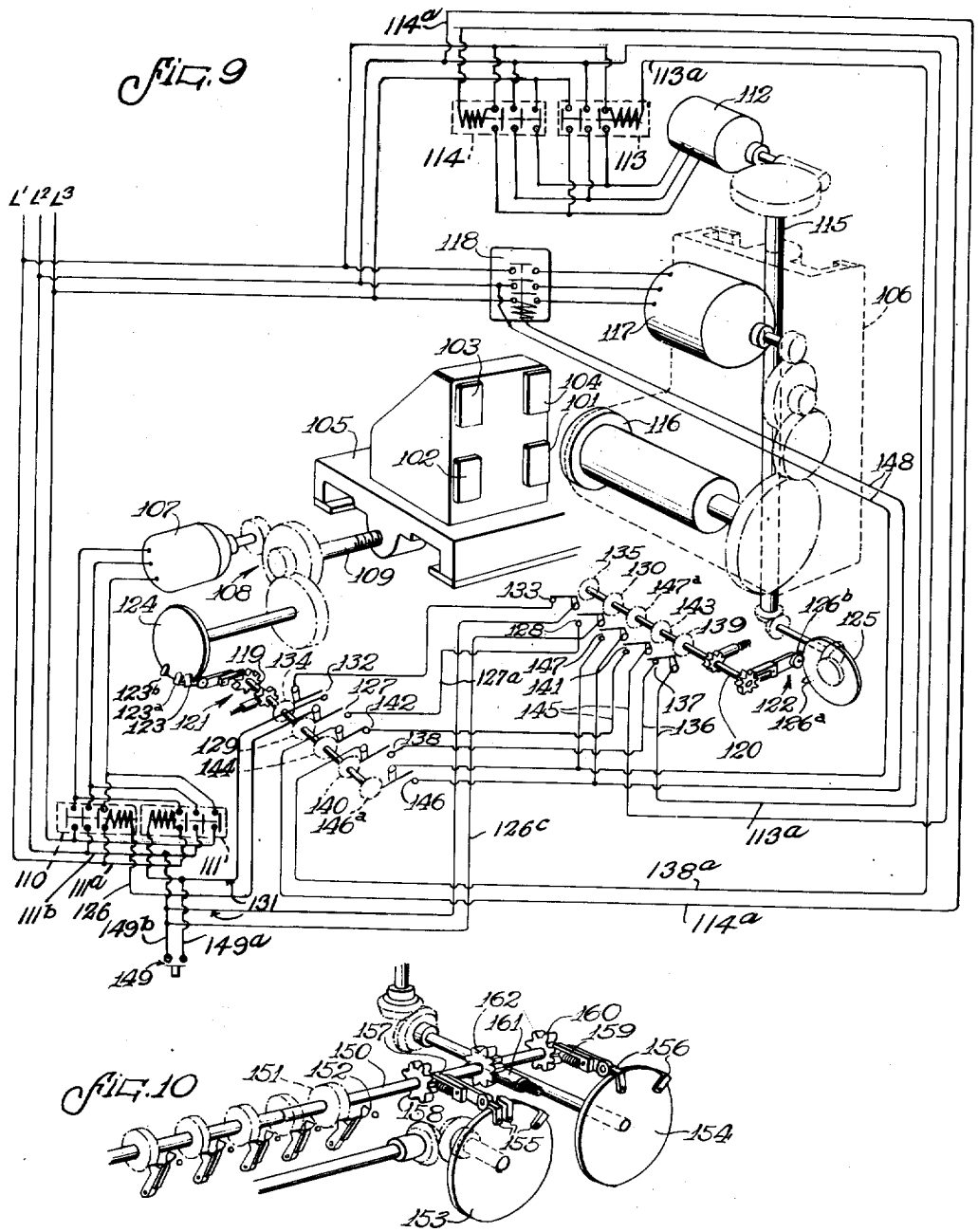

Patented Feb. 18, 1936

2,030,890

UNITED STATES PATENT OFFICE 2,030,890

CONTROL MECHANISM FOR MACHINE TOOLS AND THE LIKE

Alexander Oberhoffken, Rockford, Ill., assignor to Ingersoll Milling Machine Company, Rockford, Ill., a corporation of Illinois Application April 1, 1933, Serial No. 663,893

14 Claims. (Cl. 172—239)

This invention relates generally to the automatic control of machine tools and more particularly to the control of the drive mechanisms thereof for programming the relative movements between the tool and work supports in a machine tool so as to cause a series of movements of different character to occur automatically in a definite sequence predetermined by the character of the work to be machined.

The general object of the invention is to provide a program control mechanism of the above character which is simple and inexpensive in construction, which is reliable in operation and enables a high degree of accuracy to be obtained in the control of the machine tool movements, which is flexible in character and readily adaptable to a wide variety of machining operations, which may be adjusted quickly and cheaply to change the character of the cycle controlled thereby, and which may be embodied in a machine tool as a compact unitary controller disposed in an out-of-the-way yet readily accessible position.

The invention also resides in novel features of construction by which the control mechanism is adapted for governing the cyclic operation of motor driven actuators in a machine tool.

Other objects and advantages of the invention will become apparent from the following detailed description taken in connection with the accompanying drawings, in which Figure 1 is a schematic view of a control system embodying the present invention applied to a typical machine tool set-up.

Fig. 3 is an elevational view of the major parts of the control mechanism.

Figs. 4, 5 and 6 are sectional views taken respectively along the lines 4—4, 5—5 and 6—6 of Fig. 3.

Figure 1:
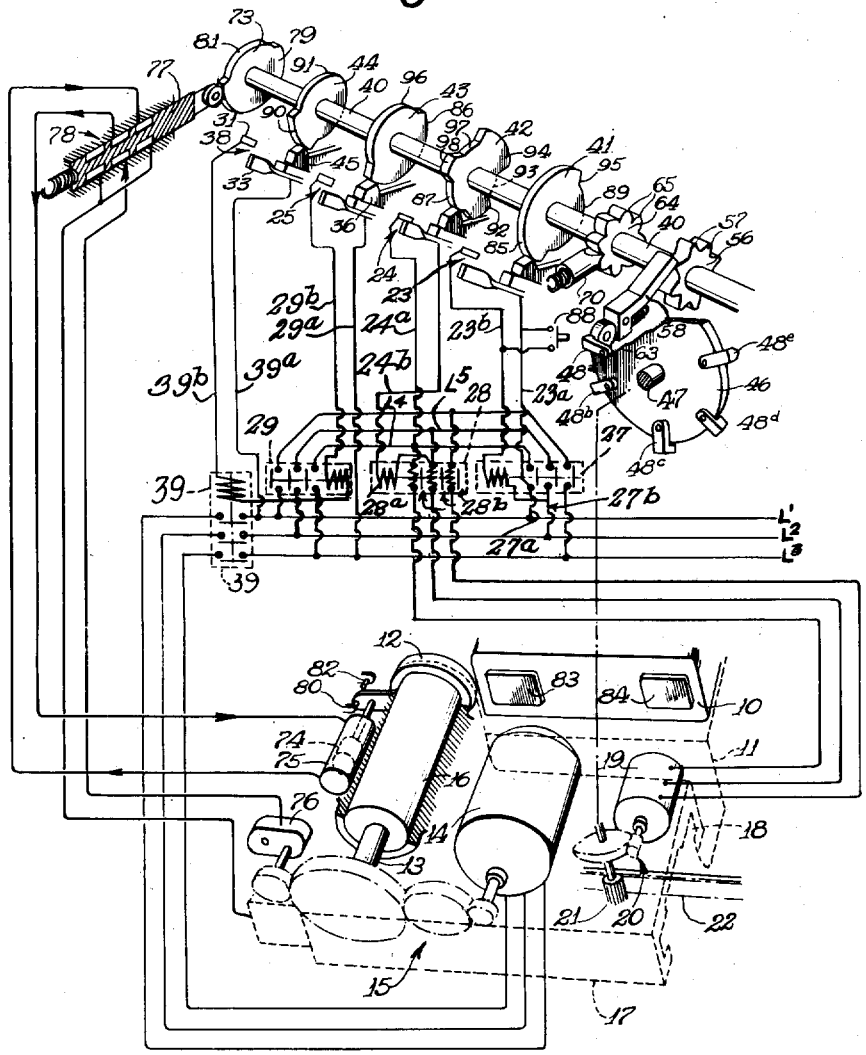
Figure 7:
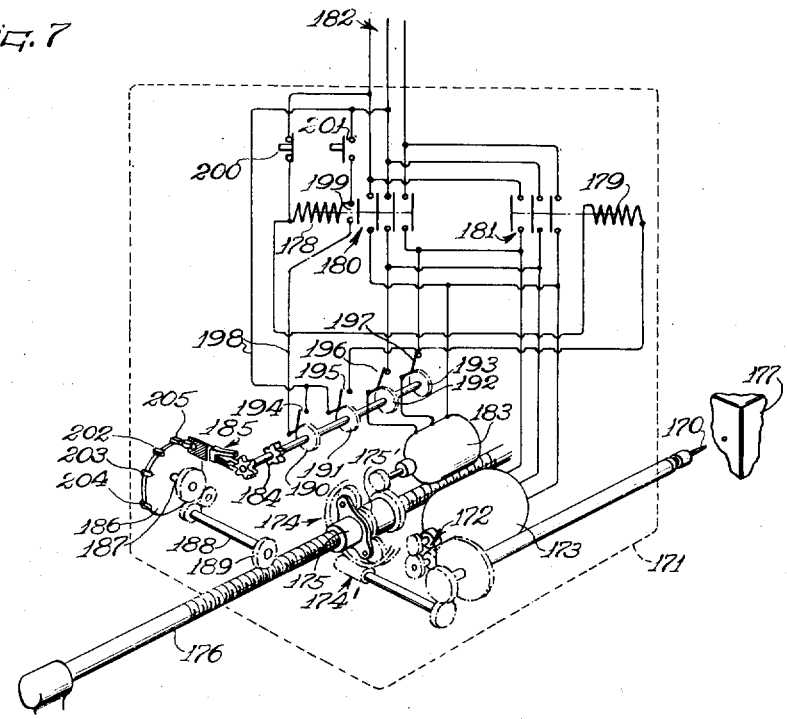

Fig. 7 is a view similar to Fig. 1 showing a different machine tool set-up.

Figure 8:
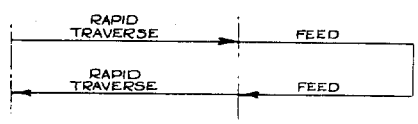

Fig. 8 is a diagrammatic view of the cycle executed by the machine tool set-up shown in Fig. 7.

Fig. 9 is a view similar to Fig. 1 illustrating still another machine tool set-up.

Fig. 10 is a fragmentary perspective view of a modified form of the control mechanism shown in Fig. 9.

While the invention is susceptible of various modifications and alternative constructions, I have shown in the drawings and will herein describe in detail the preferred embodiments thereof, but it is to be understood that I do not thereby intend to limit the invention to the specific forms disclosed, but intend to cover all modifications and alternative constructions falling within the spirit and scope of the invention as expressed in the appended claims.

In the exemplary form shown in Fig. 1, the invention is utilized to effect a series of relative movements between a work-piece 10 positioned on a support 11 and a tool herein shown as a milling cutter 12 fast on a spindle 13 rotated by an electric motor 14 through speed reduction gears 15. The spindle is journaled in a sleeve 16 mounted on a carriage 17 for endwise reciprocation relative to the latter. The carriage is slidably supported on ways 18 for endwise reciprocation during which the cutter is moved laterally of its axis in a rectilinear path.

Power for effecting relative feeding movement between the work and tool supports along said path is supplied, in the present embodiment, by a multi-speed reversible electric motor 19 herein mounted on the carriage 17 and acting through speed reduction gearing 20 to drive a pinion 21 meshing with a stationary rack bar 22. Rotation of the motor in one direction or the other will thus cause the carriage to be advanced relative to the work in a corresponding direction and at a rate determined by the speed of the motor.

The automatic programming mechanism contemplated by the present invention includes at least one primary control element or selector operable unidirectionally through each machine cycle to effect operation in a predetermined sequence of a set of pilot controls in turn governing the starting, stopping, direction and speed of the feed motor, the primary element being actuated by a secondary or timing element movable in one direction or the other according to the direction of relative movement of the tool and work supports.

With the electric power drive and feed control above described, the pilot controls take the form of switches 23, 24 and 25 having their contact terminals connected by conductors 23ᵃ, 23ᵇ, 24ᵃ, 24ᵇ, 29ᵃ and 29ᵇ to the terminals of the coils of magnetic switches or relays 27, 28 and 29 respectively. The relay 27, when energized, initiates and maintains operation of the motor 19 in a direction to advance the tool carriage 17 to the right as viewed in Fig. 1. Reverse feed occurs when the relay 29 is energized. Relative movement between tool and work supports at different speeds to effect normal "feed" and "rapid traverse", "rapid approach", or a "quick return"

movement may be effected in different ways. This is accomplished in the present instance by varying the speed of the motor 19 by the action of the relay 28, low speed being obtained when either of the relays 27 and 29 is energized with the relay 28 deenergized. When the relay 28 is also energized, the motor runs at "rapid traverse" speed.

The switches 23, 24 and 25 are arranged adjacent each other and each includes a stationary contact plate 31 insulated from and supported by a plate 32 which may be secured to the machine tool in any desired out-of-the-way yet accessible position. The movable switch contacts comprise bars 33 mounted on and yieldably urged by springs 34 toward insulating blocks 35 which in turn are secured to levers 36 mounted on a common pivot 37 and urged by individual springs 38ª toward switch-closing positions. An additional similarly constructed switch 38 is also employed in the present embodiment and arranged to control a relay 39 by which the cutter drive motor 14 is started and stopped. The terminals of the relay coil are connected to the switch 38 by conductors 39ª and 39ᵇ.

In the present instance, the primary control element above referred to takes the form of a shaft 40 arranged to be operated with a step-by-step unidirectional movement, preferably, though not necessarily, through one revolution for each cycle of the machine controlled thereby. The shaft is rotatably supported by the plate 32 and secured to the shaft, as by suitable keys, is a series of cams 41, 42, 43 and 44 axially spaced along the shaft so as to be disposed opposite the tapered ends 45 of the respective levers 31 which constitute the cam followers.

Each cam has one or more lobes which, when in engagement with the followers 36, hold the respective switches open, the switches being held closed by the springs 34 and 38ª when followers encounter depressions of the cam surfaces. The circumferential length of each depression is determined by the proportion of the machine cycle during which the switch controlled thereby is to be closed. As will appear later, the stepping movements of the shaft 40 are of sufficient length to move the leading surface or trailing surface of a cam lobe completely past the follower tip 45 and these surfaces are so arranged with respect to the rest positions of the shaft that the latter never stops with a tip 45 engaging one of these surfaces.

The secondary or timing element above referred to, by which the primary or selector element is actuated and the distances through which the tool or work support is moved in different parts of the cycle thereby determined, comprises a member carrying a row of relatively adjustable control devices and mounted for movement in unison with the tool or work support as the case may be. While this member may, if desired, take the form of an elongated bar mounted on the carriage 17, it is shown herein as comprising a circular disk 46 fast on an end of a shaft 47 projecting from a housing 41ª which is rigid with and extends transversely of the plate 32 at one end of the shaft 40 whose axis intersects the shaft 47. To drive the shaft 47 in unison with the tool carriage, the other end has a gear connection with the shaft carrying the pinion 21 by which the carriage is reciprocated. With this arrangement, the disk 46 will turn in one direction or the other according to the direction of rotation of the motor 19 and at a rate corresponding to the speed of the latter.

In the present instance, the control devices above referred to are in the form of dogs 48 arranged around the periphery of the disk 46 and spaced according to the control functions to be performed. Each dog comprises a block slotted on one side to fit over the edge of the disk with a flange 49 seated in an annular groove 50 of the disk. By tightening a screw 51 threading through a flange 52 of the block, the latter may be clamped firmly in any desired circumferential position. Projecting from the block parallel to the axis of the disk 46 is a projection 53 having side surfaces 54 which converge to a point 55.

Means is provided for advancing the cam shaft 40 through a predetermined distance in one direction as each dog on the disk 50 passes a predetermined position regardless of the direction of movement of the disk. In the present embodiment, this means comprises a ratchet mechanism including a wheel 56 fast on the cam shaft 40 and having equally spaced teeth 57 which are adapted to be engaged by one end of a reciprocable pawl 58. The opposite end of the latter is pivoted at 59 upon a plunger 60 slidable endwise in a chamber disposed within the housing 41ª and extending transversely of the shaft 40. A spring 61 acts on the plunger to retract the pawl 58 which is urged by a spring 62 into engagement with the teeth 57. The end of a plunger 60 which projects from the open end of the chamber carries a roller 63 adapted to be engaged by the cam surfaces 54 on the dogs 48. Thus, as each dog passes the roller, the plunger is forced inwardly by engagement of the leading cam surface with the roller 63. During this movement, the pawl 58 engages one of the teeth 57 thereby advancing the shaft 40.

To reduce the current burden on the control switches and provide for a high degree of accuracy in the timing of the switch movements, with respect to the movements of the tool, means is provided for advancing the shaft 40 with a rapid or snap motion through the final portion of each step after the shaft has been moved through a predetermined angle by the pawl 58. This means comprises a wheel 64 (Fig. 5) fast on the shaft 40 adjacent the wheel 56 and having equally spaced teeth 65 with side surfaces converging outwardly to points 66. The adjacent sides of the adjacent teeth converge inwardly to form notches terminating at points 67 which determine the different rest positions of the shaft 40. Power for thus advancing the shaft in the final portion of its movement is supplied by a compression spring 68 acting between an adjustable stop 69 and a plunger 70 having cam surfaces 71 which converge to a point 72 and bear against the teeth 65.

It will be apparent that when the shaft 40 is at rest, the point 72 of the plunger 70 will be seated between two of the teeth on the wheel 64 as shown in Fig. 5, the pawl 58 being then withdrawn behind one of the teeth 57 as shown in Fig. 6. Now, as a dog 48 on the disk 46 engages the roller 63 upon movement in either direction, the leading surface 54 of the dog will press the roller and the plunger 60 inwardly whereupon the pawl 58, acting on the wheel 56, will advance the shaft 40 and the wheel 64 thereon. During the advance of the shaft 40, the leading surface of one tooth 65 cams the plunger 70 outwardly thereby compressing the spring 68. Before the advance of the pawl is interrupted, that is, before the point 55 on the dog passes over the center of the roller 63, the point 66 on the tooth 65 passes over-center or beyond the point 72 on the plunger 70 whereupon the spring 68 is released and the plunger 70, acting upon the trailing surface of the engaged tooth 65, advances the shaft 40 rapidly until the point 72 becomes seated in the next notch on the wheel 64 whereupon the step of movement of the shaft is terminated abruptly in a definite position of the shaft.

A quick advance of the shaft 40 will occur as above described each time one of the dogs 48 passes the roller 63 while moving in either direction owing to the provision of the two inclined surfaces 54 on the dog. In this way, a definite number of stepping movements are imparted to the shaft to define one cycle of the machine and during each step one or more of the cams on the shaft may act to open or close the corresponding control switches, although it will be seen that certain of the steps may be mere idle motions.

For some machine tool set-ups, it may be desirable to effect a cross-feed of the tool in the course of the cycle. This may be accomplished, if desired, by hydraulic feed mechanism controlled by a cam 73 on the shaft 40 in proper timed relation to the machine cycle. In the illustrative embodiment shown in Fig. 1, the sleeve 16 supporting the tool spindle 13 is mounted on the carriage for endwise movement under the action of a piston 74 within an hydraulic cylinder 75 adapted to be supplied with fluid maintained under pressure by a pump 76. The cam 73 is arranged to actuate a follower 77 connected to the movable member of a pilot valve 78 controlling admission of the fluid to opposite ends of the cylinder 75. When the follower is in engagement with a lobe 79 on the cam, fluid is admitted to the forward end of the cylinder and the sleeve retracted against a stop 80 positioned to locate the cutter for part of the machine cycle. As the follower drops into the cam depression 81, the valve admits fluid to the opposite end of the cylinder whereupon the cutter is fed forwardly and stopped automatically in a position determined by a stop 82.

Figure 2:
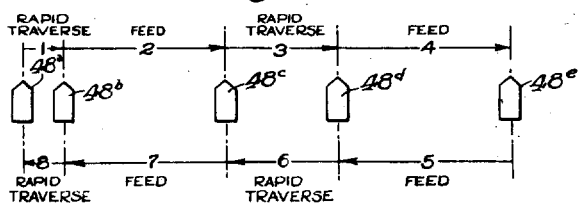
Fig. 2 is a diagrammatic view showing the different steps in the cycle defined by the control mechanism shown in Fig. 1.

The operation of the control mechanism will now be described with reference to the typical milling operation illustrated in Fig. 1 in which two spaced pads 83 and 84 on the work piece 10 are rough milled as the cutter is advanced horizontally in one direction and finished in the reverse movement of the cutter. For this work, the shaft 40 is arranged to be advanced in eight steps, indicated by the numerals in Fig. 2, to define different parts of a cycle as follows: (1) a rapid approach of the tool to the first pad 83, (2) feed across this pad, (3) rapid traverse to the pad 84, (4) feed across the latter, (5) advance of the tool for the second cut and reversal of the feed back across the pad 84, (6) rapid traverse to the first pad, (7) feed across the latter, and (8) rapid traverse back to starting position. For this cycle, five dogs 48ª, 48ᵇ, 48ᶜ, 48ᵈ and 48ᵉ are spaced around the disk 46 as shown in Fig. 1, corresponding to the distances through which the tool is moved in the first four parts of the machine cycle, the same dogs acting to control the remainder of the cycle. The shape of the different cams will become apparent from the following description of the operation.

Let it be assumed that the parts are in starting position shown in Fig. 1 in which the motor starting switches 23 and 25 are held open by engagement of their followers with raised portions 85 and 86 of the respective cams 41 and 43. The speed control switch 24 is closed by engagement of its follower 36 with a depressed surface 87 of the cam 42, thereby preparing a circuit extending from the line L⁴ through conductor 24ª, switch 24, conductor 24ᵇ, relay coil 28ª to the line L³. Current will be available at the lines L⁴ and L⁵ when either of the relays 27 and 28 is energized. Energization of the relay 28 short circuits resistances 28ᵇ to effect the speed control. Under the conditions assumed, the raised portion 79 of the cam 73 is holding the valve 78 in a position to maintain the cutter supporting sleeve 16 retracted against the stop 80. The disk 46 is positioned with the dog 48ª engaging the roller 63 and partially depressing the plunger 60, the pawl 58 not having been retracted in the previous cycle enough to pick up a tooth 57. To initiate the cycle, a manually operable switch 88 is held closed by the operator, short-circuiting the switch 23 and energizing the relay 27 to initiate operation of the feed motor 19 at rapid traverse speed owing to the fact that the switch 24 is then closed. The starting circuit extends from the power line L¹ through conductors 27ª and 23ª, the switch 88, conductor 23ᵇ, the coil of the relay 27, conductor 27ᵇ to the line L². The carriage 17 will thus be advanced to the right as viewed in Fig. 1 and the disk 46 turned in unison in a clockwise direction. In the initial movement of the disk, the dog 48ª acts on the roller 63 causing an idle inward motion of the pawl 58. As the dog passes the roller, the pawl is retracted and finally drops in behind the next tooth 57.

As the cutter approaches the pad 83, the dog 48ᵇ on the disk 46 engages the roller 63 causing the pawl 58 to be actuated and the shaft 40 to be advanced slowly during which a leading surface on one of the teeth 65 presses the plunger 70 outwardly thereby compressing the spring 68. As the plunger passes over-center with respect to the engaged tooth, the plunger is thrust inwardly under the action of the spring 68 and, acting as a cam upon the trailing surface of the tooth, causes the shaft 40 to run ahead of the pawl 58 at a rapid rate. This first step of the cam shaft movement is completed as the tapered end of the plunger becomes seated in the notch between the teeth of the wheel 64. In the latter or rapid part of this movement, the lever 36 controlling the switch 23 rides down the trailing end of a raised portion 85 of the cam 41 into a depression 89 thereby closing the switch 23 so that the relay remains energized independently of the switch 88 which may then be allowed to open and the machine tool cycle thus placed within the exclusive control of the cam shaft 40. At the same time, the raised portion 92 of the cam 42 opens the switch 24 deenergizing the relay 28 thereby introducing the resistances 28ᵇ in the conductors leading to the feed motor 19 causing interruption of the rapid traverse feed but continuing the cutter advance at "feed" speed. The third function performed in the quick movement of the shaft 40 is to start the cutter drive motor 14 which occurs as the lever 36 controlling the switch 38 rides off from a raised portion 90 of the cam 44 into a depression 91. This completes a circuit from the line L¹ through conductor 39ª, a switch 38, conductor 39ᵇ, the coil of the relay 39 to the line L².

The third part of the cycle is initiated under the control of the dog 48ᶜ which engages the roller 63 as the cutter passes the pad 83. In the ensuing quick advance of the control shaft to its third rest position, the lever 36 of the switch 24 passes off from the raised portion 92 into a depression 93 allowing the switch to close which again initiates rapid traverse. Slow feed of the cutter across the pad 84 takes place in the fourth part of the cycle which is initiated by opening of the switch 24 by the lobe 94 of the cam 42 in the third step of the cam shaft movement which is caused by the action of the dog 48$^d$ as the cutter approaches the pad 84.

At the remote end of the pad 84, the dog 48$^c$ becomes effective to advance the shaft 40 in its fourth step during which the forward feed control switch 23 is opened as the lever 36 thereof encounters the leading edge 95 of the cam lobe 85. Also the follower 77 enters the depression 81 and moves the valve 78 to cause advance of the cutter sleeve 16 against the stop 82. The cutter is thus positioned for a second cut across the pads. In the same movement of the control shaft 40, the follower controlling the reverse feed switch 25 passes out of contact with the raised portion 86 of the cam 43 into a depression 96 thereby causing the relay 29 to be energized and the direction of the motor at "feed" speed to be reversed. The circuit is from the line L$^3$, conductor 29$^a$, switch 25, conductor 29$^b$, the relay coil, to the line L$^2$. The cutter is thus advanced back across the pad 84 in the fifth part of the machine cycle while the cam shaft remains in its fifth rest position with the switch 24 held open by the lobe 94.

After the pad 84 has been finished, the same dog 48$^d$ which caused the third step of the cam shaft movement engages the roller 63 and causes the fifth movement of the shaft during which the switch 24 is closed to initiate rapid traverse as its follower enters a depression 97 of the cam 42, the reverse feed switch 25 remaining closed. The next step of the cam shaft movement occurs under the control of the dog 48$^c$ as the cutter approaches the pad 83 and in this movement, the switch 24 is opened by a cam lobe 98 thereby initiating the seventh part of the cycle to advance the tool at "feed" speed across the pad 83. When the latter has been completed, the shaft 40 is advanced for the seventh time under the control of the dog 48$^b$, a depression 87 of the cam 42 again initiating rapid traverse of the cutter.

In the approach of the cutter to starting position, the dog 48$^a$ causes the eighth and final step of the cam shaft movement during which the cam lobe 79 actuates the valve 78 to cause retraction of the cutter sleeve against the stop 80, the cams 41, 43 and 44 open their respective switches 23, 25 and 38, stopping the feed and cutter drive motors 19 and 14 leaving all parts of the control mechanism positioned as shown in Fig. 1 and in condition for starting of another cycle of the machine after a new work-piece has been mounted on the table. The motor 19, it will be observed, is stopped with the dog 48$^a$ still in engagement with the roller 63.

To illustrate the manner of applying the present control mechanism to other types of machine tools, reference will now be made to Fig. 7 wherein the control is utilized to define a simple cycle of movement of a tapping tool 170 rotatably supported upon a horizontally movable head 171. The tap is arranged to be rotated through gears 172 from a reversible motor 173 carried by the head. In the present instance, the motor also serves to move the head endwise at "feed" speed, which may be accomplished through speed reduction gearing 174' driving the ring gear of a planetary differential 174 having an intermediate or driven member in the form of a nut 175 rotatable on a non-rotatable screw shaft 176 and held against endwise movement. Thus, when the other driving gear 175' of the differential is held against rotation, operation of the motor 173 in one direction or the other will cause corresponding rotation of the nut 175 about the shaft 176 resulting in movement of the head in a corresponding direction. Selective operation of the motor 173 in opposite directions is controlled by pilot relays 178 and 179 which actuate sets of switches 180 and 181 for connecting the motor to power lines 182 in a manner such as to cause rotation of the motor in one direction or the other according to which of the relays is energized.

In this embodiment, rapid approach and rapid return movements of the head are produced by operation of a supplemental reversible motor 183 simultaneously with the feed motor 173. To this end, the motor 183 is also mounted on the head with its shaft connected through speed reduction gearing to the gear 175' of the planetary differential. As will later appear, the motor 183 when in operation supplements the drive of the feed motor 173 and causes the head to be advanced in the same direction but at higher speed. Owing to the light burden imposed upon the rapid traverse motor, it may be of small capacity and controlled without the use of relays.

As in the case of the set-up shown in Fig. 1, the cycle of relative movements between the tap 170 and the work-piece 177 is defined by a single cam shaft 184 arranged to be advanced step-by-step by a ratchet mechanism 185 constructed and held in its different rest positions in the same manner as the cam shaft 40 above described and actuated by dogs clamped to a rotary disk 186. To drive the disk in unison with the tap, it is herein fast on a shaft 187 geared to a shaft 188 which is rotatably mounted on the head 171 and carries a worm-wheel 189 meshing with the stationary screw 176. In the feeding movement of the head, the wheel 188 rolls along the shaft 176 turning the disk 186 at a speed and in a direction corresponding to that of the head.

To define the simple cycle illustrated in Fig. 8, the shaft 184 has four cams 190, 191, 192 and 193 thereon acting upon suitable followers to actuate switches 194 and 195, 196 and 197 respectively during the quick advancing movements of the cam shaft. The switch 194 is interposed in a conductor 198 extending from one power lead to a switch 199 having a terminal connected to one terminal of the relay 178, the other terminal of the latter extends to another power lead through a manually operable normally closed switch 200. The relay will thus be maintained energized when both of the switches 194 and 199 are closed. The switch 199 is actuated by the armature of the relay, being closed when the relay is energized. The relay may be energized independently of the switches 194 and 199 by closure of a manually operable switch 201 interposed in the relay circuit in parallel with the switches 194 and 199. The circuit for the relay coil 179 extends through the switch 200 and the switch 195 actuated by the cam 191. The switches 196 and 197 are interposed respectively in two circuits for the rapid traverse motor 183 respectively extending through the relay switches 180 and 181. Thus, the motor 183 can operate to cause rapid approach of the head only when the relay 178 is energized, and the quick return of the head can occur only when the relay 179 is energized. For this reason, the switches 196 and 197 may be opened and closed simultaneously and by the same cam if desired.

Assuming the parts to be positioned as shown in Fig. 7, the cycle illustrated in Fig. 8 is executed in the following manner, the switches 196 and 197 having been closed in the movement of the cam shaft 184 in the preceding cycle. To start the cycle, the manually operable switch 201 is closed thereby energizing the relay 178 which closes the switches 180 completing the circuits for both of the motors 173 and 183 which start in directions to cause quick approach of the head toward the work and clockwise rotation of the disk 186. In the initial movement of the disk, a dog 202 becomes effective to actuate the ratchet 185 and advance the cam shaft one step. During the rapid portion of this step, the cam 190 allows the switch 194 to close thereby completing the holding circuit for the relay 178 through the locking switch 199.

As the head approaches the work, a dog 203 advances the shaft through its second step during which the switches 196 and 197 are opened thereby stopping the motor 183, which thereafter serves to hold the gear 175' of the planetary differential against rotation as the motor 173 thus continues in operation to feed the tap into the work. When the tap has been entered to the proper depth, a dog 204 advances the shaft 184 and the cams 190 and 191 open the switch 194 and close the switch 195 deenergizing the relay 178 and energizing the relay 179. The direction of rotation of the motor 173 is reversed and retraction of the tap at feed speed initiated. In this movement, the dog 204 passes out of engagement with the ratchet without advancing the shaft 184.

After the tap has left the work, the dog 203 again becomes effective to advance the cam shaft whereupon the switches 196 and 197 are closed by the cams 192 and 193 and the motor 183 started in a direction to cause quick return of the head to starting position. In this movement, the dog 202 advances the cam shaft through an idle step of motion without changing the condition of the switches. When starting position is reached, a dog 205 actuates the ratchet, and in the ensuing motion of the cam shaft, the switch 195 is opened thereby interrupting the operation of the motors 173 and 183. The switches 196 and 197 remain closed in order to prepare the circuit for starting of the motors 173 and 183 at the beginning of the next cycle. If it is desired to interrupt the cycle at any time, this may be accomplished by opening the manually operable switch 200 thereby interrupting the circuit for whichever relay is then closed.

The wide range of flexibility of the control systems above described will be apparent from a consideration of the different ways in which the mechanism may be changed in order to adapt the machine cycle to the character of the work to be done. Since the cams on the shaft or primary control element determine the character of the operations performed in the different parts of the machine cycle, the operations may be varied as desired simply by varying the arrangement and configuration of the cams. The initiation and termination of the different parts of the cycle, being determined by the dogs on the disk or secondary control element, may readily be changed simply by varying the number and spacing of the dogs around the disk. The dogs are of simple construction and rigidly attached to the disk so that they will operate reliably especially in view of the light motions which they are required to produce where, as in the present instance, the control functions are performed through the medium of pilot devices such as the relays or hydraulic valves. The accuracy with which the dogs operate is thus increased materially. In view of the use of the dogs as a secondary control unit acting through the medium of the independently operable primary control unit, each dog, by movement in opposite directions, may produce two stepping movements of the cam shaft and therefore be utilized to control two parts of the machine cycle. The control mechanism is thus admirably adapted for governing a machine cycle in which the machine element whose movement is controlled moves out of and back into a predetermined starting position in each machine cycle.

The control mechanism also forms a compact unit which may be located in any desired out-of-the-way position upon the machine tool and yet can be rendered readily accessible to the operator for removal and replacement of the cam shaft and adjustment of the dogs. By virtue of the quick snap action by which each stepping movement of the cam shaft is completed, it will be apparent that a high degree of accuracy in the starting and stopping of the cutter movements may be obtained without necessitating formation of the leading and trailing surfaces of the cam projections with a correspondingly high degree of accuracy. To obtain this desired action, it is merely necessary to arrange the leading and trailing surfaces of the control cams so that these surfaces will pass their followers during the final or rapid portions of the cam shaft movements as above described. Such quick action is also desirable in that the deterioration of the control switches is reduced to a minimum.

In the exemplary machine tool cycles above described, it will be observed that the cutter support moves in a rectilinear and in opposite directions. The invention is also adaptable to machine cycles requiring cross-feeding of the tool and work supports in two or more directions. A typical machine tool setup involving such crossfeed is shown diagrammatically in Fig. 9, the work-piece having four pads 101, 102, 103 and 104 to be milled, arranged in two vertically spaced horizontal rows.

As in the forms of the invention first disclosed, relative movements between the work and tool supports 105 and 106 are effected by electric motor driving means. Relative horizontal movement is produced by a reversible motor 107 acting through speed reduction gearing 108 to drive a screw 109 and thereby advance the work support along its ways in either direction according to which of two starting relays 110 and 111 is energized. Relative vertical movement is produced by a reversible motor 112 controlled by relays 113 and 114 and arranged to drive a screw 115 by which the carriage 106 is raised and lowered. The cutter, numbered 116, is rotated by a motor 117 controlled by a relay 118. For certain types of work, it may be desirable also to provide for movement of the tool or work at rapid traverse or other speeds in which case the motors 107 and 112 would be equipped for multi-speed operation as in the exemplary set-up shown in Fig. 1.

In the set-up shown in Fig. 9, the relays governing the operation of the motors 107 and 112 are controlled by individual cam shafts 119 and 120 mounted in the same way and driven with step-by-step movements through the medium of ratchet mechanisms 121 and 122 in the same manner as the cam shaft 40 above described. The mechanism 121 is actuated by dogs 123 on a disk 124 geared to the shaft 109 so as to turn in unison with the movement of the work-support 105. A disk 125 having dogs 126ᵃ and 126ᵇ thereon geared to the shaft 115 actuates the ratchet mechanism 122. In order that the control of the machine tool cycle may be transferred back and forth between the two cam shafts 119 and 120 as will appear later, each of the relays 110, 111, 113 and 114 is controlled by two switches arranged in series circuit and actuated by cams on the shafts 119 and 120 respectively. The circuit for the relay 110 extends through a conductor 126 and two switches 127 and 128 controlled by cams 129 and 130 and the circuit for the relay 111 includes a conductor 131 and switches 132 and 133 actuated by cams 134 and 135. The relay 113 is connected by a conductor 136 in series circuit with two switches 137 and 138 actuated by cams 139 and 140. Switches 141 and 142 actuated by cams 143 and 144 and connected by a conductor 145 control the relay 114. To control the relay 118, two switches 146 and 147 in parallel with each other are connected by a conductor 148 to the relay and actuated by cams 146ᵃ and 147ᵃ.

The operation of the control mechanism as arranged in Fig. 9 is as follows, assuming the cutter 116 to be in starting position with the cutter drive motor 117 and the feed motors 107 and 112 at rest by virtue of the switches 127, 132, 138, 146, 128, 147 and 141 being held open by their respective cams. To start the cycle, the operator closes a switch 149 which short-circuits the switch 132 establishing an energizing circuit for the relay 111 whereupon the motor 107 is started in a direction to advance the work-support 105 horizontally and to the right. This circuit is from the line L¹ through conductor 111ᵃ, the relay coil, conductor 149ᵃ, switch 149, conductors 149ᵇ and 111ᵇ to the line L². In the initial movement of the disk 124 with the work, a dog 123ᵃ becomes active to advance the cam shaft 119 one step during the rapid portion of which the switch 132 is allowed to close, completing the circuit for the relay 111 independently of the switch 149, the switch 133 being then held closed by the cam 135. This circuit is from the coil of the relay 111 through the then closed switch 133, switches 132 and 133 connected in series and shunted across the switch 149 by conductors 131. In this same movement of the camshaft, a switch 146 is closed completing a circuit for energizing the relay 118 and starting the cutter drive motor 117. This switch and the coil of the relay are interposed in a conductor 148 between the power lines L² and L³.

The forward feed continues until the cutter has roughed the entire surfaces of the pads 101 and 102 whereupon a dog 123ᵇ causes the shaft 119 to be advanced in the second step of its movement during which the cam 134 opens the switch 132 deenergizing the relay 111 and interrupting the operation of the motor 107. Also, the cam 129 allows the switch 127 to close and the cam 144 opens the switch 142. In the same movement of the shaft 119, a cam 140 thereon allows the switch 138 to close thereby energizing the relay 113 and starting the motor 112 in a direction to move the tool carriage 106 upwardly. The circuit is from the power line L¹ through the coil of the relay 113, conductor 113ᵃ, the then closed switch 137, the switch 138, conductor 138ᵃ to the line L². The control of the cycle is thus transferred from the shaft 119 to the shaft 120.

After the cutter 116 has covered the entire surface of the pad 103, a dog 126ᵃ on the disk 125 causes the shaft 120 to be advanced one step during the rapid portion of which movement the cam 139 opens the switch 137 interrupting the drive by the motor 112. Cams 143 and 147ᵃ also allow the switches 141 and 147 to close. At the same time, a cam 130 allows a switch 128 to close which energizes the relay 110 through the then closed switch 127 whereupon the motor 107 is started in a direction to move the work support horizontally and to the left as viewed in Fig. 9. The circuit is from the line L¹ through the coil of the relay 110, conductor 126, switch 127, conductor 127ᵃ, switch 128, conductor 126ᶜ to the line L². Now the cycle is again under the control of the shaft 119. In the initial part of this movement, the dog 123ᵇ passes out of operative association with the ratchet mechanism 121 without advancing the shaft 119. In the first part of the movement, the dog 123ᵃ advances the cam shaft 119 through an idle step of motion without changing the condition of the switches controlled thereby.

When the cutter has operated upon the entire surface of the pad 104 and passed out of engagement therewith, the dog 123 becomes active to advance the shaft 119 through its fourth movement whereupon the switch 127 is opened by a cam 129 which interrupts the horizontal movement of the support 105. Simultaneously, the cam 144 allows the then open switch 142 to close which completes the energizing circuit for the relay 114 through the then closed switch 141, starting the motor 112 in a direction to drive the tool support 106 downwardly. The circuit is from the line L¹, the coil of the relay 114, conductor 145, the switches 141 and 142, conductor 114ᵃ to the line L². The cam 146ᵃ opens the switch 146 but the motor 117 continues to operate by virtue of the switch 147 being then closed. As the tool support 106 starts downwardly, the dog 126ᵃ moves out of association with the ratchet mechanism 122 without actuating the latter. In the approach of the cutter to its starting position, a dog 126ᵇ advances the cam shaft 120 during which the switch 141 is opened to interrupt the operation of the motor 112. In the same movement, the switch 147 is opened stopping the motor 117 and the switch 133 is closed ready for the next cycle. Thus the cycle is terminated automatically with the cutter in starting position and the dog 126ᵇ in contact with the roller of the ratchet mechanism 122.

While two or more control shafts may be employed, as shown in Fig. 9, to define a cycle involving cross-feeding, a substantial reduction in the number and complexity of the parts required may be obtained by arranging a single cam shaft for step-by-step advance by a plurality of ratchet mechanisms actuated respectively from the power operators producing the different directional feeds. Such an arrangement is shown in Fig. 10 wherein a cam shaft 150 is employed and arranged to make one revolution for each machine tool cycle during which the shaft traverses a plurality of steps corresponding to the different parts of the cycle, the same as with the set-up shown in Fig. 1.

Assuming the cycle to be defined is the same as that exemplified in Fig. 9, five cams 151 on the shaft would be arranged to actuate five switches 152, one for controlling each of the relays 110, 111, 113, 114 and 115. The feed motors 107 and 112 would be connected respectively to disks 153 and 154 having dogs 155 and 156 arranged thereon in positions corresponding to the distances through which the tool and work supports are to be moved by the respective power operators. The dogs 155 are arranged to actuate a pawl 157 operating upon a ratchet wheel 158 on the cam shaft while the dogs 156 advance the shaft step-by-step through the medium of a pawl 159 and a ratchet wheel 160, each step of movement by either set of dogs being completed by the action of a spring-pressed plunger 161 acting upon a toothed wheel 162. In operation to define the cycle exemplified in Fig. 9, the cam shaft 150 would be advanced first by one pawl and then the other.

By combining the controls as above described, the number of switches, cams, and other parts required are reduced to a minimum. In this way, any number of cross-feeds may be employed in the cycle which may be controlled simply by adding to the mechanism shown in Fig. 1, one set of dogs and a ratchet mechanism for each cross-feed and arranging the cam shaft to control the proper switches.

I claim as my invention:

1. In combination with relatively movable supports and electric motor driven operating means for moving one of said supports in opposite directions between two limit positions and at different speeds in one of said directions, a control mechanism comprising a primary control element movable unidirectionally in a succession of steps during each cycle of relative movements between said supports, switching means operated selectively by said element in its different respective positions and governing the direction of operation of said operating means to define said cycle, said element acting when advanced to an intermediate position in one of said steps to control said operating means and change the speed of relative movement between said supports, a secondary control member movable as an incident to the operation of and in a direction and at a speed corresponding to said operating means, a series of control devices spaced apart along said secondary element according to the distances through which said movable support is to be moved in different parts of said cycle, and means operable upon engagement by each successive control device to advance said primary element through one step, one of said devices acting to advance said primary element when the movable support is intermediate said limit positions.

2. In combination with relatively movable supports and electric motor driving means for effecting relative movements between said supports in different directions and at different speeds, a control mechanism comprising an element movable step-by-step through a plurality of rest positions, switching means governing the starting, stopping and speed of operation of said driving means and variably controlling said driving means to produce relative movements of different character in each of said positions to determine the direction and speed of relative movement between said supports, and means actuated according to the extent of relative movements between said supports and operating to advance said element through a plurality of rest positions during relative movement in one direction between said supports.

3. In combination with relatively movable supports and electric motor driving means for moving one of said supports, a control mechanism comprising, in combination, a shaft mounted for unidirectional rotation, a control member movable in unison with said movable support, a row of independently adjustable dogs on said member spaced according to the distances through which said movable element is to be advanced, an endwise movable plunger disposed in the path of said dogs and adapted to be depressed upon engagement by each dog while moving in either direction, means for advancing said shaft unidirectionally and step-by-step in response to successive depressions of said plunger, and means including a plurality of cams on said shaft and a plurality of switches controlling the starting, stopping and speed of said driving means and operating to define a predetermined cycle of movement for said movable support.

4. A control mechanism of the character set forth having, in combination with a pair of relatively movable supports and power driving means for effecting relative movement between said supports in opposite directions, a primary control element movable unidirectionally and controlling said driving means, a secondary control element movable according to the relative movement between said supports and having a dog member thereon, a plunger member mounted for movement into and out of the path of said dog member and normally urged into said path, one of said members having converging cam surfaces acting on the other member according to the direction of movement of the dog member whereby to shift the plunger member out of said path upon movement of the dog past the plunger in either direction, and ratchet mechanism for advancing said primary element forwardly one step each time said plunger is shifted out of said path.

5. A control mechanism of the character set forth having, in combination with a pair of relatively movable supports and power driving means for actuating one of said supports, a control element movable unidirectionally with a step-by-step movement and adapted when in different rest positions to control said driving means selectively and thereby cause a predetermined cycle of relative movements between said supports to be executed automatically, a rotary member geared to said movable support so as to rotate in unison with the movements thereof, a plurality of dogs rigid with but adjustable circumferentially of said member, and a ratchet mechanism operated intermittently in response to the successive dogs presented thereto and operable to advance said element through its successive steps.

6. Mechanism for automatically controlling the relative movements between two supports in a machine tool or the like having, in combination, a rotary control shaft, a member movable continuously during relative movement between said supports and having a series of dogs thereon, a reciprocable pawl arranged to be moved in one direction by each of said dogs, a ratchet wheel on said shaft having teeth engaged by said pawl, a series of radially projecting teeth on said shaft angularly spaced intermediate said ratchet teeth and each having outwardly converging intersecting cam surfaces, a spring, a plunger urged toward said surfaces by said spring and acting to place the spring under stress upon actuation by the leading surface of one of said last mentioned teeth, said plunger acting on the trailing tooth surface under the action of said spring to cam said shaft forwardly as the tooth passes overcenter with respect to said plunger, and a plurality of control switches actuated by said shaft during the advance of the latter by said spring.

7. A control mechanism of the character set forth having, in combination with relatively movable supports and power driving means for moving one of said supports in a substantially rectilinear path, a control element, means movable in unison with said movable support along said path and operable to advance said element intermittently through a succession of steps, means actuated by said element controlling said driving means to determine the character of the feed between said supports, a power actuator for effecting relative cross-feeding movement between said supports in a direction transversely of said path, means actuated by said element in one of said steps to initiate operation of said actuator, and means acting automatically and independently of said control element to render said actuator ineffectual after said supports have been cross-fed through a predetermined distance.

8. A control mechanism of the character set forth having, in combination with relatively movable supports and electric motor driving means for moving one of said supports, in a substantially rectilinear path, a control element, means movable in unison with said movable support along said path and operable to advance said element intermittently through a succession of steps, switching means actuated by said element controlling said driving means to determine the starting, stopping and direction of the feed between said supports, a second electric motor driving means operable to effect relative cross-feeding movements between said supports in a direction transversely of said first mentioned path, and switching means actuated by said element to control the operation of both of said driving means and cause a predetermined cycle of relative movements between said supports to be executed.

9. A control mechanism of the character set forth having, in combination with two relatively movable supports and two independent power operators operable to move said supports relative to each other along different paths extending transversely of each other, a control element movable unidirectionally in successive steps and operable to control one of said operators and produce relative movements of different characters between said supports along one of said paths, means actuated as an incident to the operation of said last mentioned operator to impart intermittent step-by-step movements to said element, a second control element movable unidirectionally in successive steps and operable to control the other power operator and produce a series of relative movements of different characters along the other of said paths, means actuated as an incident to the operation of said last mentioned operator to impart intermittent step-by-step movements to said second control element, and means actuated by one of said elements in one of its steps to initiate operation of the power operator by which the other control element is advanced.

10. A control mechanism of the character set forth having, in combination with two relatively movable supports and two independently operable power operators operable to effect relative movements between said supports along two different paths extending transversely of each other, a control element advanced intermittently and step-by-step as an incident to operation of one of said operators, a second control element advanced intermittently and step-by-step as an incident to operation of said other operator, and means actuated by one of said elements in one of its movements to interrupt operation of the operator causing such movement and initiate operation of the other operator.

11. A control mechanism of the character set forth having, in combination with a pair of relatively movable supports, two power operators having independently operable electric motor driving means to effect relative movements between said supports along two different paths extending transversely of each other, a member carrying a plurality of variably spaced control devices and movable as an incident to the operation of one of said operators, a member carrying a plurality of control devices and movable as an incident to the operation of the other of said operators, a control element advanced step-by-step through a predetermined distance as the control devices on the respective members pass predetermined points, and switching means actuated selectively in the step-by-step movement of said element to govern the operation of both of said motor driving means to define a cycle of relative movements between said supports.

12. A control mechanism for machine tools and the like having, in combination with a movable support and two electric motors operable singly or in combination to advance the support in opposite directions and at fast and slow speeds in at least one direction, a control element movable unidirectionally with a step-by-step movement, a member movable in unison with said support and having a series of control dogs thereon variably spaced according to the cycle to be executed by said support, means disposed in the path of said dogs and operable upon engagement by the successive dogs to cause movement of said element through a succession of rest positions, switching means actuated by movement of said element into one of said rest positions to govern the operation of said motors and change the movement of said support from said fast to said slow speed, said switching means acting in a subsequent movement of said element to interrupt the movement of said support by said motors.

13. In combination with two relatively movable supports and power driving means for effecting relative movement therebetween in opposite directions and at different speeds, a control mechanism having, in combination, a member movable back and forth according to the relative movements between said supports, an element controlling the operation of said driving means and movable unidirectionally, a plurality of control devices carried by said member, follower positioned for operative association with said control devices and operable when actuated thereby to cause said element to be advanced one step, one of said devices passing said follower in both directions of relative movement between said supports whereby to advance said control element through two steps in a complete cycle of movement of said supports back and forth between said limit positions.

14. In combination with two supports relatively movable in opposite directions between two limit positions and power means for effecting relative movement between said supports in one direction at different speeds in at least one direction, a control mechanism comprising a member movable in unison with the actuated support and having two terminal and one intermediate control devices mounted on said member in spaced relation for adjustment relative to each other, said terminal devices corresponding to said limit positions, an element mounted for step-by-step unidirectional movement, means responsive to the movement of said element by the intermediate control device to control said power means and change the speed of relative movement between said supports, manually operable means by which the application of power from said driving means to one of said supports may be initiated independently of said element, and means actuated by said element upon movement by one of said devices to interrupt the drive and terminate the relative movement between the supports.

ALEXANDER OBERHOFFKEN.